United States Patent

Iwasaki et al.

[11] Patent Number: 5,972,493
[45] Date of Patent: Oct. 26, 1999

[54] MICROCAPSULES FOR MAGNETIC DISPLAY AND MAGNETIC DISPLAY SHEET COMPRISING SUCH MICROCAPSULES

[75] Inventors: Takashi Iwasaki; Sadatoshi Igaue; Atushi Ogura, all of Fuchu, Japan

[73] Assignee: Chemitech, Inc., Tokyo, Japan

[21] Appl. No.: 08/512,285

[22] Filed: Aug. 8, 1995

[30] Foreign Application Priority Data

Aug. 10, 1994 [JP] Japan ................................. 6-208199
Aug. 12, 1994 [JP] Japan ................................. 6-210727
Mar. 31, 1995 [JP] Japan ................................. 7-100043

[51] Int. Cl.$^6$ ............................................. B32B 5/16
[52] U.S. Cl. ......................... 428/323; 428/335; 428/336; 428/341; 428/343; 428/692; 428/694 BN; 428/694 BA; 428/900
[58] Field of Search ........................ 428/323, 335, 428/336, 341, 343, 692, 900, 694 BN, 694 BA

[56] References Cited

U.S. PATENT DOCUMENTS 4,701,024  10/1987  Kobayashi et al. ................. 350/331 R
5,151,032   9/1992  Igawa ...................................... 434/309
5,186,631   2/1993  Okutsu ................................... 434/409
5,411,398   5/1995  Nakanishi et al. ...................... 434/409

*Primary Examiner*—H. Thi Le
*Attorney, Agent, or Firm*—Michael N. Meller; Eugene Lieberstein

[57] ABSTRACT

Gelatin microcapsules for magnetic display enclosing therein dispersion medium, magnetic powder and nonmagnetic powder, characterized in that that the dispersion medium in the microcapsules is composed of at least low boiling point solvent, particle diameter of the microcapsules is ion a range of 400 μm tap 800 μm and particles bigger than average are removed out. And solvents with boiling point higher than 175 ° C., dispersant and suspension are contained in the dispersion medium, magnetic powder and nonmagnetic powder are affinity-treated. The microcapsule magnetic display sheet is produced by coating the above-described microcapsules. Therefore, recording speed and erasing speed are fast and recorded words or pictures are clear even if a magnetic force lower than 1100 gauss is used.

12 Claims, 7 Drawing Sheets

FIG. 3A   COATING STEP
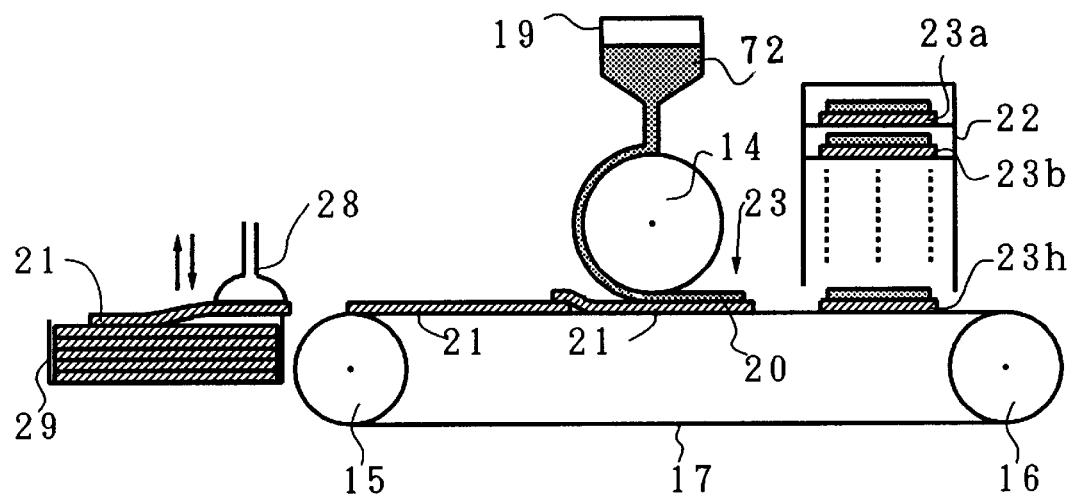
FIG. 3B   DRYING STEP
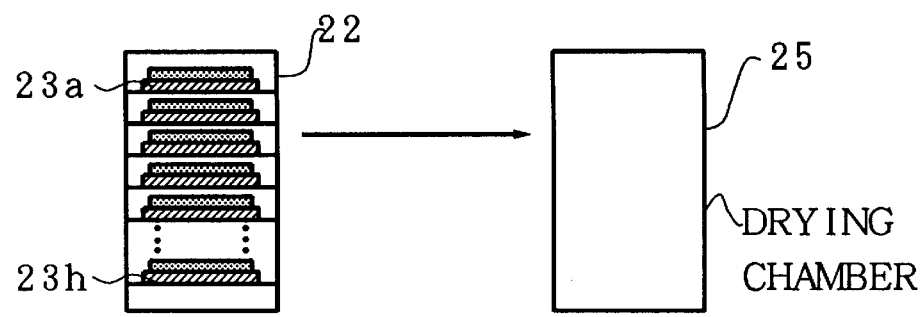
FIG. 3C   LAMINATING STEP
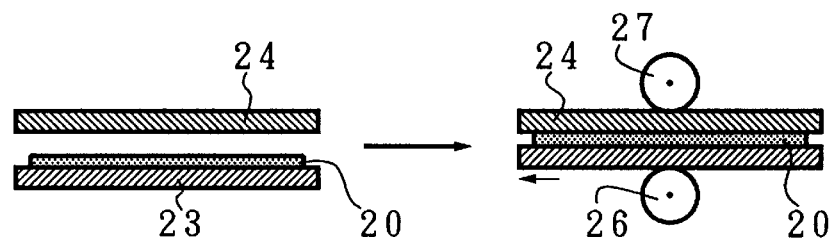

MICROCAPSULES FOR MAGNETIC DISPLAY AND MAGNETIC DISPLAY SHEET COMPRISING SUCH MICROCAPSULES

BACKGROUND OF THE INVENTION

1. Field of the Invention

The present invention relates to gelatinized microcapsules for magnetic display in which a dispersion medium, magnetic powder and nonmagnetic powder are enclosed.

2. Description of the Prior Art

Many methods of magnetic display are well known to date; for example, a magnetic display method that makes small rooms between two plates, seals ball-shaped magnetic powder and tungsten oxides particles in liquid in the small rooms and makes a display by moving the magnetic powder to the surface by magnetic force (So-called as moving type as noted below) was published in Japanese Patent Publication Kokoku S51-10959. Furthermore, inventions published in Japanese Patent Publication Kokoku S57-27463, S59-31710, S59-47676 and S62-53359 have made an improvement of the dispersion medium in order to afford a good dispersion of the magnetic powder and the tungsten oxide particles. Among them, there is an invention concerning a magnetic display system in practical use that makes small rooms with a size of 4 mm$^3$, having honeycomb shape on a supporting plate, injects liquid having a white pigment and magnetic powder therein in the honeycombs and laminates and seals a transparent sheet on it to finish it. According to this display system, a display may be made by scanning a magnet on the back surface of the magnetic display plate from one side to the opposite so as to attract the magnetic powder in the honeycombs to the back surface and to make the surface white. While making contact using a permanent magnetic pen with the surface of the magnetic display, the magnetic powder in the contact part moves to the surface and image appears.

On the other hand, in Publication of Japanese Patent Publication Kokoku S54-29895, a magnetic record medium that is produced by coating microcapsules having sensitive flakes in it that have sensitivity to a magnetic field and are floating in a liquid on a base plate is described. According to this invention, when a magnetic field is brought to bear on the magnetic record medium, the sensitive flakes in the microcapsules are oriented in a perpendicular direction, only a part of the sensitive flakes is under the magnetic field, moves in longitudinal direction, orients to horizontal to the magnetic record medium and shows an image (so-called as deflection type as below). The same magnetic display method using the magnetic flakes are also published in a Publication of Japanese Patent Application Laid-open S63-153197, S64-19384 and H1-145637. The two types of moving type and deflection type are also published in a Publication of Japanese Patent Publication Kokoku S55-29880. In the magnetic display system using ball-shaped magnetic powder, an invention according to which a better display may be made by specifying the size of microcapsules and mixing two kinds of microcapsules of different sizes is described in Japanese Patent Publication Kokoku H4-233581.

There are some problems among the inventions published to date, particularly in Japanese Patent Publication Kokoku H4-233581. The magnetic display method by using microcapsules consisting of the ball-shaped magnetic powder in it can not be put into practical use, because although a good display may be made, the images are not clear and the recording speed and erasing speed are slow when the magnetic force is weak.

Further, the microcapsule particles may be destroyed gradually while writing repeatedly by a magnetic pen and clearness of the display sheet diminishes. Durability of the display sheet has to be improved.

Therefore, the inventors of the invention have conducted many researches and discovered that the durability of microcapsule magnetic display sheet depends on the thickness and hardness of the transparent film and the arrangement of a cushion element (pressure-proofing film) adjacent to the microcapsule dispersoid and the destruction of the microcapsules caused by pressure is relieved by the thickness and hardness of the transparent film. The inventions have been accomplished based on the discoveries mentioned above.

SUMMARY OF THE INVENTION

According to the above circumstances, it is a first object of the present invention to provide gelatinized microcapsules for magnetic display that can record words or pictures in a high degree of clarity and with high record speed under a weak magnetic force lower than 1100 gauss.

A second object of the invention is to provide a microcapsule magnetic display sheet with durability and clarity and a method thereof.

The gelatinized microcapsules for magnetic display of the invention, are characterized in that the dispersion medium in the microcapsules being composed of low boiling point solvent and the size of the microcapsules in average being 200 $\mu$m to 800 $\mu$m. The microcapsules of the invention have the merits of displaying speed and erasing speed being rapid and words and the pictures recorded by them being very clear while use.

Furthermore, microcapsules having a particle diameter bigger than the average diameter are removed therefrom. Thus, when ink is produced by mixing the microcapsules with binders and is painted on a base plate in a thickness of 800 $\mu$m, lack of clarity caused by big microcapsules disappears. And, it is clarified that when the microcapsules are formed essentially in a size of 400 $\mu$m±x $\mu$m to 800 $\mu$m±x $\mu$m (x=10~20), and clearer words or pictures may be recorded.

The dispersion of the low boiling point solvent from the capsule film can be prevented by mixing solvents with boiling point higher than 175° C. into the low boiling points solvent. Addition and dispersion of a dispersant in a dispersion medium makes the magnetic powder and nonmagnetic powder uniform and long-keeping. As the magnetic powders are kept in this station for a long time with stability by adding suspension in the dispersion medium, the words or pictures formed can be kept for a long time correspondingly. Furthermore, the magnetic and nonmagnetic powder may be moved under a weak magnetic force as they are affinity-treated.

After adding gum arabic in the capsuled mixture, good microcapsules are formed by reducing pH to acidity and cooling it below 20° C. to form the gelatin gum arabic membrane.

Eliminating water from the prepared microcapsules to form condensed liquid containing a microcapsule slurry and condensation in 40% to 70% is desirable. The condensed microcapsules are dispersed in aqueous transparent adhesives to form ink and then the ink is coated on a transparent base film. One of microcapsule dispersoids or pressure-proofing film may be colored. Pigment may also be added in the microcapsules or membrane if necessary.

In the invention, by removing the particles bigger than average, unclearness caused by destruction of the big particles may not occur. The microcapsules are dispersed from which the big particles are removed out in aqueous transparent adhesives. The particles in a size of 200 μm±x μm to 200 μm±x μm(x=10~20) are desirable.

Viscosity of the microcapsule dispersoid is desirable to be suitable for coating on the base film. The viscosity will be different depending on the season. After regulating it to 15,000 cp to 35,000 cp, it is coated on a base film and then drying it to prepare a microcapsule coating layer.

The microcapsule magnetic display sheet has an order of pressure-proofing film, microcapsule dispersoid and transparent film. As the microcapsule dispersoids are supported by the pressure-proofing film, the destruction of the microcapsules in the microcapsule dispersoid caused by a writing pen is prevented and the recorded words or pictures are kept for a long time in good clarity.

The method of producing a microcapsule magnetic display sheet is composed of the processes of coating microcapsule dispersoids containing magnetic powder and nonmagnetic powder and dispersion medium on a transparent film, drying it to form a microcapsule dispersoid layer, and adhering a pressure-proofing film having an adhesive layer thereon to the surface of the dispersoid layer. The pressure-proofing film is filled to the concave parts of the uneven surface of the dispersoid layer firmly without gaps (vapor bubbles) to form an adhesive part.

Examples of low boiling point solvent which can be used in the gelatinized microcapsules for magnetic display are: benzene, ethylbenzene, toluene, o-xylene, m-xylene, p-xylene, mesitylene, cumene, methyl cyclohexane, ethyl cyclohexane, dibutyl ether, 2-pentanone, 3-pentanone, 2-hexanone, methyl isobutyl ketone, heptane, octane, nonane, 4-heptanone, 1-pentanol, butyl acetate, isobutyl acetate, isopentyl acetate, etc. Among them, toluene, o-xylene, m-xylene, p-xylene, methyl cyclohexane, ethyl cyclohexane, butyl acetate, isobutyl acetate, isopentyl acetate etc. are the most usable in the invention. One kind or a mixture of two kinds of them are usable.

Example of a high boiling point solvent which has a boiling point higher than 175° C. and which can be used in the present invention are: 1-pentanol, 1-octanol, 2-octanol, 2-ethyl-1-hexanol, 1-nonanol, 3,5,5,-trimethyl-1-hexanol, benzyl alcohol, 1,2-propane diol, 1,3-butanediol, etc. 1-octanol, 2-ethyl-1-hexanol, 3,5,5-trimethyl-1-hexanol, benzyl alcohol are the most usable. While mixing the low boiling point solvent with the solvents with boiling point higher than 175° C. according to the invention, toluene and 1-octanol, toluene and 2-ethyl-1-hexanol, toluene and 3,5, 5-trimethyl-1-hexanol, toluene and benzyl alcohol, xylene (o-xylene, m-xylene, p-xylene) and 1-octanol, xylene and 2-ethyl-1-hexanol, xylene and 3,5,5-trimethyl-1-hexanol, xylene and benzyl alcohol are the desirable mixtures. While the boiling point of the solvents with high boiling point being lower than 175° C., a bad influence on the actions of the magnetic powder may occur. The reasons which can be considered are that the boiling point of the solvents with high boiling point is so similar to that of the low boiling point solvent that the viscosity and volatility of the dispersion medium can not be suppressed. In this invention, mixtures of low boiling point solvents and solvents with high boiling points are used as the dispersion medium and mixtures of solvents with high boiling point with toluene or xylene, and further mixtures of alcohol compounds with toluene or xylene are desirable.

Polyoxyethylene laurylether, polyoxyethylene cetylether, polyoxyethylene stearyl ether, polyoxyethylene oleyl ether, anion fatty group ester mixtures and amine polycarbonate may be pointed out as the dispersant used in the invention to disperse and the magnetic powder. The quantity of the dispersant used is the same as traditional of 0.5% to 10% in weight, and most suitable one is 1.0% to 3.0% in weight. If the quantity of the dispersant is less than 0.5% in weight, no good effect may be made and if it is more than 10% in weight, the viscosity of the dispersant goes so high that the characteristics of the dispersant may be destroyed.

In the invention, in the case of solvents with a boiling point lower than 175° C., a bad influence on the action of the magnetic powder can occur. The reason for that may be considered as the boiling point is so near to that of solvents with low boiling point that the viscosity and volatility are restrained.

While mixtures of the low boiling point solvent and that with boiling point higher than 175° C. being used in the invention, the quantity used of the solvents with high boiling point is desirable to be 20% to 250% of the quantity of the low boiling point solvent in weight and 50% to 150% in weight are most desirable. While rate of the quantity of the solvents with high boiling point to that of the low boiling point solvent being less than 20%, the dispersion of the low boiling point solvent can not be prevented and while that being more over than 250% in weight the action of the magnetic powder will become worse. Absolute silicic acid, water-bearing silicic acid, sodium silicate, silicates (sodium silicate, potassium silicate, aluminum silicate, calciumsilicate etc. ), alumina fine powders, silica powders, siliceous earth, kalion, hard clay, soft clay, bentonite, calcium carbonate fine powders, activated potassium carbonate fine powders, calcium hydrogencarbonate, calcium water-bearing alkali magnesium carbonate, barium sulfate, benzidine yellow may be pointed out as the precipitation-prevention agents. One kind or mixtures of two kinds of them are usable. The adding quantity of the suspension to the dispersion medium is different depending on the dispersion medium, 0.2% to 5% of the dispersion medium in weight is general, 0.4% to 2% in weight is the most desirable. If the quantity of the suspension is less than 0.2%, no good precipitation-preventing effects may be desirable, and if the quantity is more than 5% in weight, the suspension may be an obstacle to the actions of the magnetic powder.

The magnetic powder used in the invention are the traditional ones well-known in the technical field, for example, black iron oxide, manganese dioxide-bearing iron oxide, chromium dioxide, ferrite, iron or nickel fine powders, iron-nickel alloy etc. One or mixture of two kinds of them may be used. In order to mix the magnetic powder with other elements easily, the magnetic powder sold on market are affinity-treated. TODACARA-KN-320 in trademark, magnenite made by TODA INDUSTRY INC. and TAROKKUSU BL-220 in trade mark, composite iron oxide made by CHITAN INDUSTRY INC. may be the example. The particle diameter of the magnetic powder is desirable to be smaller than 10 μm, 0.01 μm to 5 μm may be more desirable and 0.1 μ to 0.3 μm are the best. According to the invention, while the particle diameter of the magnetic powder being over than 10 μm, such problems as the clarity of words being worse and the response displaying and erasing speed being low will occur. And while the particle diameter being smaller than 0.1 μm, the magnetic powder will condense and not disperse. Titanium dioxide, and rutile pigments may be pointed out as the nonmagnetic powder used in the invention. No limit to the particle diameter of the nonmagnetic powder so long as they can be dispersed enough. 0.1 μ to 1 μm may be good and big particles are not desirable as light shading decreases.

Colorants may be added in the dispersion medium of the microcapsules or the gelatin membrane of the invention so the magnetic display sheet may be colored. Usual pigments and dyestaffs, specially aqueous pigments may be used as the colorants. Such dyestaffs as methylene blue, Congo red, benzo-yellow and such pigments as oil blue, oil green, oil yellow, benzidine yellow, new lactisum (made by DAINISEI CHEMISTRY INC.) are desirable.

In this invention, the magnetic and nonmagnetic powder are desirable to be affinity-treated. Silicon may be a better affinity-treating agent. The affinity treatment makes them easily moving. Surfaces of the magnetic and nonmagnetic powder are treated with water-bearing metal oxides so as to make them affinity-having. Aluminum, silicon, titanium, zinc, zirconium etc. may be pointed out as the metals by which the water-bearing metal oxides may be made. For example, a mixture of $Al_2O_3 \cdot nH_2O$ and $SiO_2 \cdot nH_2O$ is a water-bearing metal oxide, in which $Al_2O_3$ has lipophilicity and $SiO_2$ makes hydrophilicity. By changing the content of $Al_2O_3$ and $SiO_2$ the lipophilicity may be changed to hydrophilicity if necessary, and therefore the magnetic and nonmagnetic powder may be moved under a weak magnetic force. The quantity of the water-bearing metal oxides used may be 1% to 16% of the magnetic or nonmagnetic powder in weight and 3% to 10% may be better. The particle diameter of the gelatinized microcapsules for magnetic display of the invention may be 200 $\mu$m to 800 $\mu$m in average and 400 $\mu$m to 800 $\mu$m may be better. While particles bigger than average being used, the magnetic display sheet has no durability as the microcapsule themselves are not strong. And, when the microcapsules containing big particles are painted on a base film, the paint surface is not smooth and big particles are destroyed by case, for example while coating thickness of 800 $\mu$m, the particles bigger than 800 $\mu$m may be destroyed, therefore a clear picture may not be obtained. So it is desirable to remove the big particles. Filter or fine gip through which only small particles can pass may be used for removing the big particles. Furthermore, a thin magnetic display sheet and clear words or pictures may be made by the microcapsules with diameter 400 $\mu$m±x $\mu$m to 800 $\mu$m±x $\mu$m (x=10~20).

The gelatinized microcapsules for magnetic display in the invention may be colored. Traditional pigments and dye-staffs may be used as the colorants. Water-soluble pigments are desirable. The gelatinized microcapsules for magnetic display in the invention show words or pictures under a magnetic force after dispersed into binders and painted on a base film so as to form a magnetic display sheet. Any traditional method for displaying the words or pictures that are well known in the field may be used. According to the invention, when a magnet bigger than 1100 gauss is used for recording or erasing, displaying and erasing speed is fast and words or pictures recorded are clear and no changes occur even a magnet smaller than 1100 gauss used. In general, a magnet with 1100 to 700 gauss may be used for recording words or pictures, 1000 to 800 gauss may be better and there is no difficulty if a magnet weaker than that is used. A magnet with 200 to 300 gauss may also be used for erasing the recorded words or pictures with fast speed. Therefore gelatinized microcapsules for magnetic display of the invention are much more economic and technique. Usual coating methods, for example, brush coating, roller coating, screen coating, air curtain method, dip coating etc. may be used for coating the microcapsules on the base film.

The pressure-relieving element for magnetic display sheet used in the invention is composed of flexible cushion with thickness of 50 $\mu$m to 500 $\mu$m, 200 $\mu$m to 400 $\mu$m is better. Unwoven cloth, synthetic resin film, elastic materials, for example, gum material, foamy materials etc. may be used, synthetic resin film with adhesive layer or unwoven cloth with the adhesive layer are more desirable. The unwoven cloth with the adhesive layer may be protected by a synthetic film on its backsurface. Thickness of the unwoven cloth is desirable to be not thick from the view point of erasing, 250 $\mu$m to 500 $\mu$m is good. The adhesive layer of the unwoven cloth is 30 $\mu$m to 130 $\mu$m. A lot of kinds of adhesives may be used. For example, they can be made by adding adhesives, softening agents, aging-preventing agents, packing materials in elastomers of natural gum, isoprene gum, styrene, butadiene gum, styrene butadiene copolymer, styrene isoprene block copolymer, tutyl gum, polyisobutyrene, silicone gum, polyvinyl isobutyl ether, chloroprene gum, nitrile gum, graft gum, reproduced gum etc. The natural gum, styrene-butadiene series, acryl series and silicone are desirable.

Such natural fiber as silk cotton, linen, jute, wool, silk, cellulose fiber such as rayon, acetate, polyamide fiber as nylon, chlorinated hydrocarbon fiber as vinylidene and synthetic fiber as acryl fiber, polyurethane fiber, polypropylene fiber may be used as the unwoven cloth. The unwoven cloth may be made of the fibers mentioned above by a traditional method. While using the unwoven cloth, front surface, namely surface having microcapsule dispersoids thereon, and back surface are better to have films. Polyethylene terephthalate (as PET as below), polyethylene film, polypropylene film, chlorovinyl film, polyester film, polycarbonate film may be used as the films. The film may be adhered by adhesives and thickness of them is 50 $\mu$m to 200 $\mu$m.

While using the synthetic resin film having an adhesive layer as the pressure-relieving element in the invention, the adhesive layer plays a very important role, namely, adhering the synthetic film having adhesive layer thereon to the microcapsule dispersoid layer. The adhesives are desirable to adhere the surface of the microcapsules and no gap exists between them so flexibility of the magnetic display sheet (Strength against bending) can be improved. From the view point of protecting microcapsules and erasing recorded words easily, the thickness of the adhesive layer is not desirable to be too big, 30 $\mu$m to 130 $\mu$m is general. While the thickness of the adhesive layer being thinner than 30 $\mu$m, microcapsules can not be protected enough and destroyed possibly by pressure of a pen. While it is thicker than 130 $\mu$m, even the microcapsules may be protected but recorded words can not be erased enough. It is not economic to use a strong magnet for erasing.

According to the invention, thickness of the synthetic film is 50 $\mu$m to 200 $\mu$m. From the same view point as the above-mentioned, 100 $\mu$m to 180 $\mu$m is desirable. Natural gum, styrene-butadiene series, polychloroprene series, polyisoprene series, polyurethane series, acryl series and silicone may be pointed as the adhesives. Polyethylene terephthalate, polyethylene film, polypropylene film, chlorovinyl film, polyester film, polycarbonate film are the examples of the synthetic film used also in back surface of the unwoven cloth.

After preparing microcapsules containing magnetic powder, nonmagnetic powder and dispersion medium, they are dispersed into aqueous emulsion adhesives. Painting the prepared microcapsule dispersoid on a transparent base film takes place, followed by drying it to form a microcapsule dispersoid paint layer. The transparent film plays roles such as relieving pressure to the microcapsules to protect them from destruction. Relieving pressure to the microcapsules means the transparent film may not be bent or injured and its flexibility are not destroyed under the writing pressure. Hardness of the transparent film depends on thickness of it. Polyethylene terephthalate, polyethylene transparent film may be used but they are not the only ones. Thickness of the film may be 30 μm to 250 μm and 50 μm to 150 μm is better. The methods of painting the microcapsule dispersoids on the film are traditional, for example, brush coating, roller coating, screen coating, air curtain, or dip coating. After the coating process, a drying process follows and then laminating the pressure-proofing film on the surface of dispersoids takes place.

The magnetic display sheets are made by the method described as follows. Namely, gelatinized microcapsules for magnetic display are made by processes (I) to (III) then the magnetic display sheet are made by the processes (a) to (e).

(I) A process of adding magnetic, nonmagnetic powder and dispersion medium into the gelatin aqueous solution at a temperature of 20° C. to 60° C. and stirring them, a most desirable coacervation may be obtained by the process. The order to add the magnetic, nonmagnetic powder and dispersion medium is optional, the order of magnetic powder, nonmagnetic powder then dispersion medium is good; the order of nonmagnetic powder, magnetic powder then dispersion medium, order of dispersion medium, magnetic powder then nonmagnetic powder or dispersion medium, nonmagnetic powder then magnetic powder are all no problem. However, the order of mixing magnetic powder and nonmagnetic powder in the dispersion medium and then adding to the gelatin aqueous solution is the most desirable.

(II) A process of forming gelatin/arabic gum polymer membrane by adding arabic gum aqueous solution into the mixture above-obtained, reducing pH to acidity lower than pH4 and then cooling it to a temperature lower than 20° C., (III) A process of forming the gelatinized microcapsules by hardening the gelatin/arabic gum polymer membrane.

(a) A process of removing the particles bigger than average diameter and then eliminating water from the gelatinized microcapsules prepared above. It is desirable to eliminate the water from the prepared microcapsule slurry to keep the mixture with suitable viscosity while forming a mixture of the gelatinized microcapsules and binders. In this process, the microcapsules are arranged in average diameter or microcapsules in average diameter are used and particles bigger than that are removed. In order to remove the particles bigger than average diameter, a sieve may be used. By removing the particles bigger than average and only using the microcapsules passed through the sieve a paint layer may be kept in a good thickness, nonnative microcapsules are removed so a clear record on the display sheet may be obtained. The removing process can also be conducted with a coating process for example, setting a gap between the surface and roller and where only the unbroken particles passed through the gap may be painted on the surface.

(b) A process of preparing microcapsule dispersoids by dispersing microcapsules obtained above into aqueous transparent adhesives. As the dispersoids are desirable to have a good viscosity while coating, the viscosity of the dispersoids have to be regulated to 15,000 cp to 35,000 cp in this process. Sodium alginate, polyvinyl alcohol, modified sodium polyacrylate, modified polyacrylic acid emulsion and modified polyacrylic acid sulphate etc. may be pointed out as the viscosity regulators and the sodium alginate and polyvinyl alcohol are more desirable. The rate of the viscosity regulators depends on season's temperatures and conditions of dispersoids where 0.5% to 3.0% of the dispersoids in weight is general. While the viscosity of the dispersoids being lower than 15,000 cp, cracks of painted film may occur and records are not clear. And while the viscosity of the dispersoids being higher than 35,000 cp, the painted film are not uniform and uneven.

(c) A process of coating the dispersoids on a transparent base film. Polyethylene terephthalate, a polyethylene transparent film may be the examples used as the base film but they are not the all. The thickness of the films are 100 μm to 250 μm and 150 μm to 200 μm are desirable. As methods for coating the microcapsule dispersoids on the films mentioned above, brush coating, roller coating, screen coating, air curtain method, dip coating etc. may be used. After coating, a drying process follows. The drying temperature may be in traditional range, for example in 40° C. to 120° C., where 50° C. to 90° C. are desirable. Drying time is usually 30 min. to 50 min. Warm wind drying or convection drying are desirable as the drying methods. The thickness of the microcapsule dispersoids after drying is desirable to be 400 μm to 600 μm.

(d) A process of laminating a pressure-proofing film on the dispersoids paint layer. The pressure-proofing film is not limited and polyethylene terephthalate (PET) may be good. The thickness of the polyethylene terephthalate is desirable to be 100 μ to 250 μm.

The magnetic display sheet or magnetic display medium made by the invented method can record words or pictures with a magnet. Methods for recording words or pictures on the magnetic display sheet or medium are well known in the technical field. Any of them may be used. And the invented magnetic display sheet or medium may be used in a wide range, for example, picture books and toys for children, word-trainer, game-board, memo board, blackboard for meeting, memo board for clean room, photo-electric notice board, etc.

According to the invention, as the low boiling point solvent are used in the dispersion medium capsuled in microcapsules, displaying speed is fast even using a weak magnet. And a more clear words or pictures may be recorded as only the microcapsules in 200 μm to 800 μm are used. By removing the particles bigger than average uncleanness caused by destruction of the big particles on the coating is prevented. Because microcapsules in 400 μm±x μm to 800 μm±x μm (x=10~20) are formed essentially, clearer words or pictures are recorded. And, when solvents with boiling point higher than 175° C. are mixed in the low boiling point solvent, dispersion of the low boiling point solvent may be prevented. Additionally, by adding and dispersing emulsifiers in the dispersion medium, the magnetic and nonmagnetic powder are dispersed uniformly and kept for a long time in stable condition. Furthermore, by adding suspension in the dispersion medium the magnetic powder may be kept in displaying condition for a long time; therefore, the words or pictures recorded are very stable. By lipophilicity-treating the magnetic and nonmagnetic powder, they can be moved by a weak magnetic force.

The microcapsule dispersant layer of the magnetic display sheet produced by using the above-described microcapsules are supported by the pressure-proofing films. Therefore, the display sheet is strong against writing pressure so that destruction of the microcapsules caused by the writing pressure is prevented. The sheet has a good durability so words displayed by the sheet can be kept for a long time in a high degree of clarity.

As the invented microcapsule display sheet is composed of mainly unwoven cloth as its base film to support microcapsule dispersoid, destruction of the microcapsules in the microcapsule dispersoids is prevented by the flexibility and cushion of the unwoven cloth. Thus, the invented sheet has good durability and can be repeatedly used for a long time with keeping clarity of the formed pictures.

According to the invented microcapsule display sheet, as adhesives with a fixed thickness stick firmly to an uneven surface of the microcapsule dispersoid with no gap between them by using synthetic film having an adhesive layer thereon as the base film supporting the microcapsule dispersoids, the flexibility of the magnetic display sheet is good and the destruction of the microcapsules in the dispersoids is prevented by thickness and flexibility of the adhesive layer. Therefore, the magnetic display sheet as the same as the unwoven cloth has good durability and may be used repeatedly for a long time.

The pressure-proofing film is adhered firmly on surface of microcapsule dispersoids having an adhesive layer with no gap between them according to the invention.

On the other hand, while preparing the magnetic display sheet, a clear record without cracks on the painted film and unevenness may be obtained by regulating the viscosity of the microcapsule dispersoids. Furthermore, the microcapsule destruction may be prevented by laminating a pressure-proofing film. Aqueous pigments may be added to at least one of the components of the invented display sheet so as to color it.

BRIEF DESCRIPTION OF THE DRAWINGS

FIGS. 3A to 3C are cross-sectional views of coating equipment for manufacturing the magnetic display, in which FIG. 3A shows coating process, FIG. 3B shows drying process and FIG. 3C shows laminating process;

FIGS. 5A to 5B are cross-sectional views of writing word on the invented magnetic display sheet in which , FIG. 5A shows a magnet scanning on a backsurface of the magnetic display sheet and FIG. 5B shows a magnetic pen writing a word on the surface of the magnetic display sheet;

DESCRIPTION OF THE PREFERRED EMBODIMENTS

The invention may be described in more detail as follow but the examples here are only used for describing the invention and not makes limitation to the invention.

Example 1

Figure 1:
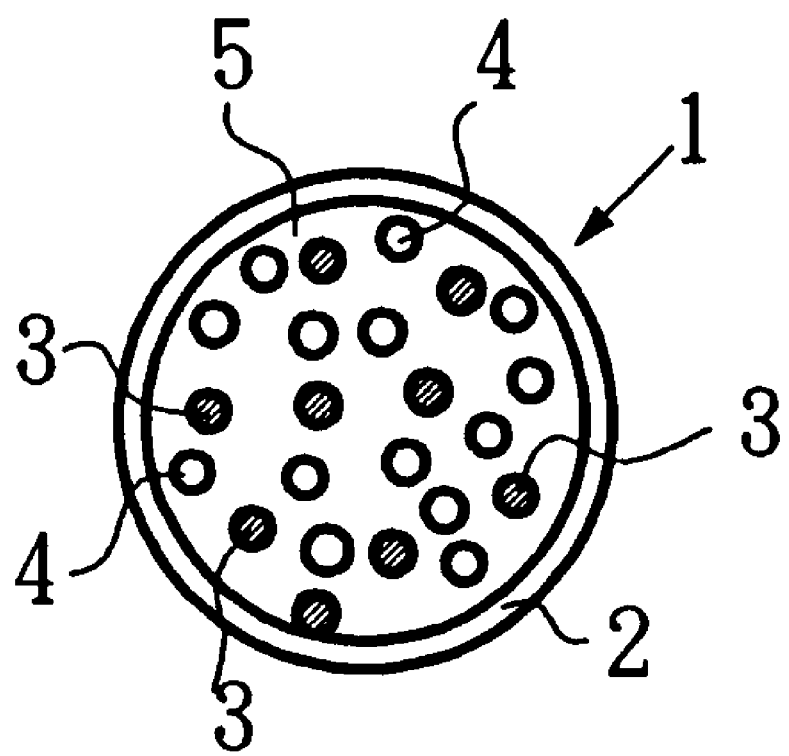
FIG. 1 is a cross-sectional view of gelatinized microcapsule for magnetic display of the invention.

The gelatinized microcapsules for magnetic display used in the invention are illustrated in FIG. 1, a cross-sectional view of model of the invention, and made by the method described below. In FIG. 1, microcapsules 1 enclose magnetic powder 3 and nonmagnetic powder 4 that are dispersed in dispersion medium 5 in a capsule membrane 2 which is formed by gelatin in the microcapsules 1, the magnetic powder 3 are ferrite powders 2% in weight (TAROKUSU BL-220 made by CHITAN INC.) with a diameter of 0.3 $\mu$m in on average and their surfaces are also treated by silicon oil. Adding the magnetic powder and nonmagnetic powder in a mixture solvents 85% in weight of toluene and 2-ethyl-1-hexanol in mixture ratio 5:3, adding PERENOLE E1(silicone mad e by SANOPOKO INC.) 0.2% in weight as defoaming agents and silicic acid powders (AEROJIRU972 made by Japan AERJIRU INC.) 0.5% in weight as suspension and then adding ammonium polycarbonate (RAKIKUERU963 made by SANOBUE INC.) 0.7% in weight as interfacial agents and dispersing them to produce the microcapsules.

Then, adding arabic gum aqueous solution with concentration 1.8 into gelatin aqueous solution with concentration 1.8% that is regulated to be pH6 to prepare aqueous solution for microcapsule membrane, heating it to 50° C., regulating it to pH=5 and pouring the dispersion medium with magnetic powder 3 and nonmagnetic powder prepared above and stirring until drops of the dispersion medium become 600 $\mu$m. After the desirable dispersion medium obtained, adding water being 4 times of gelatin, cooling it slowly and the cooling it to 10° C., gelatinizing polymer membranes of gelatin/arabic gum separated on the interface, adding glutaraldehyde aqueous solution with a concentration of 25%, hardening the polymer membranes, then the gelatinized microcapsules 1 are prepared completely. Removing particles bigger than 600 $\mu$m from the gelatinized microcapsules I prepared by the method described above, particles smaller than 600 $\mu$m are obtained. The microcapsules prepared above being 400 $\mu$ to 600 $\mu$ are 85%.

Figure 2:
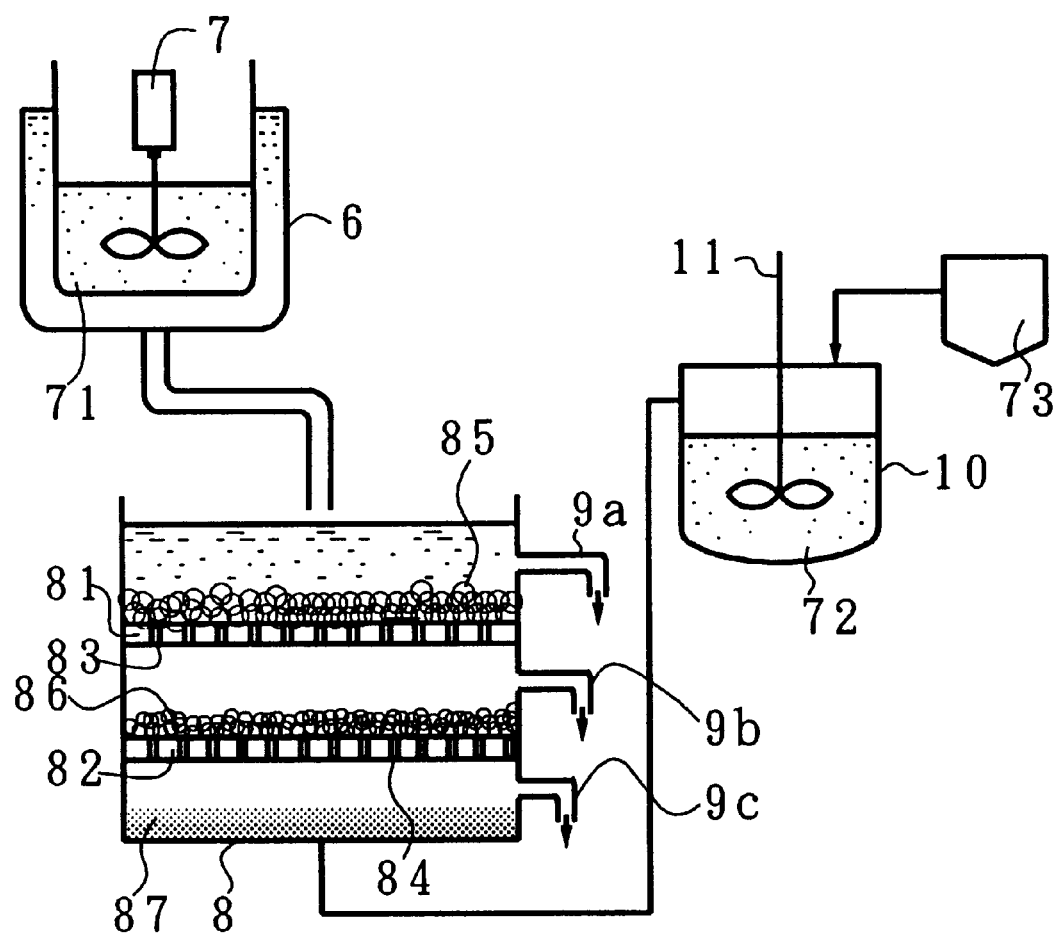
FIG. 2 is a flow sheet of preparing gelatinized microcapsule dispersoid.

FIG. 2 is a flow sheet of preparing the invented dispersolids of the gelatinized microcapsules 1. According to the flow sheet, adding above-mentioned components in a temperature controllable tank 6 with a stirrer 7, stirring, regulating temperature and pH as that mentioned above to prepare the microcapsules. The prepared microcapsule slurry 71 are introduced to filtrating equipment 8, particles 85 bigger than 600 $\mu$m and water are removed by filter 81 and only the particles 86 smaller than 600 $\mu$m are remained on filter 82. Water flows out from spouts 9a, 9b and 9c. There are holes 83 can not pass and there are holes 84 in the filter 82 through which fine particles 87 can pass. Then, in order to prepare paint ink 72, the prepared microcapsules 86 are introduced to a container 10 with a stirrer 11 and aqueous urethane resin are added and stirred as the aqueous binder 73. the prepare paint ink 72 is painted by a coating equipment as shown in FIG. 3. The viscosity of the paint ink 72 is 28,000 cp.

FIG. 3 is a cross-sectional view of the coating equipment for preparing the magnetic display sheet. FIG. 3A shows coating process. In FIG. 3A, the coating equipment is rotating along arrow by belt conveyer 17 and roller 15 and 16. Attraction element 28 that moves up and down from the film supplying equipment 29 attracts the transparent film 21 and transport it to the belt conveyer 17. The film inserts to a transported film 21 and piles up in the head part. The paint ink 72 made of microcapsule dispersoids in the tank 19 are painted on the film by roller 14. The painted sheet 23 are collected in a rack 22 and placed as 23a, 23b, ... 23h. FIG. 3B shows drying process. Rack 22 is put into a drying room 25 and dried for 40 min. by warm wind. FIG. 3C shows laminating process, a PET film as pressure-proofing film is laminated on the surface of the painted sheet 23 by adhesives and then the magnetic display sheet is finished.

Figure 4:
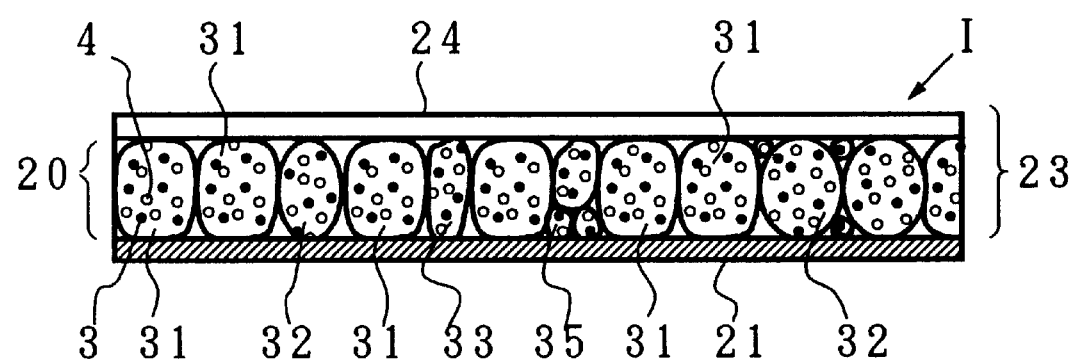
FIG. 4 is a cross-sectional view of the magnetic display sheet obtained by the invention.

FIG. 4 is a cross-sectional view of magnetic display sheet 1 prepared by the invented method and gelatinized microcapsules. In FIG. 4, after the above-prepared microcapsules 1 are dispersed in binders, they are painted on a PET film 21 to form a microcapsule paint layer 23 and then, a PET film as a pressure-proofing film is adhered to the paint layer by adhesives. The microcapsules are arranged suitably in the magnetic display sheet I. In stead of PET film 21, glass fiber, glass, paper, other hard sheet or soft flexible film that have strength enough to protect the microcapsules 20 may be used.

Figure 5A:
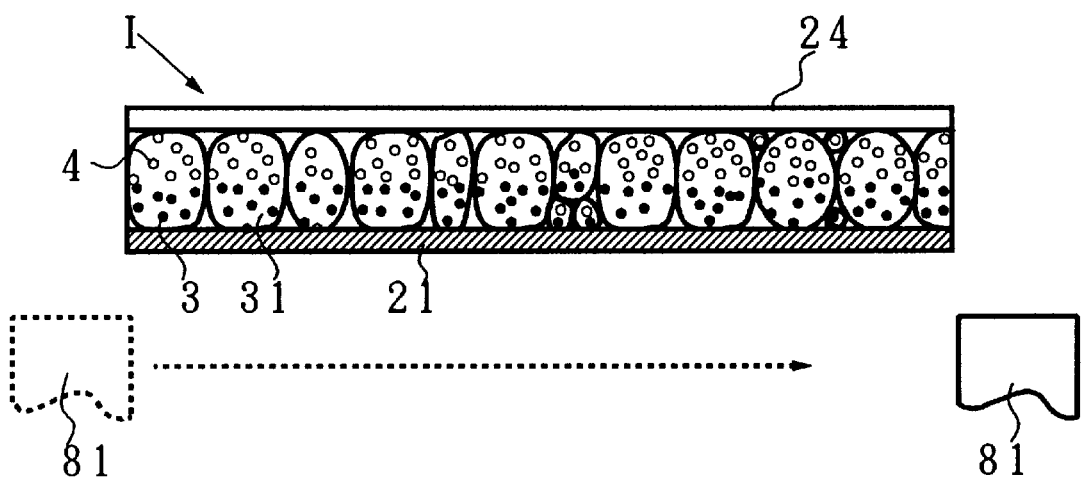
Figure 5B:
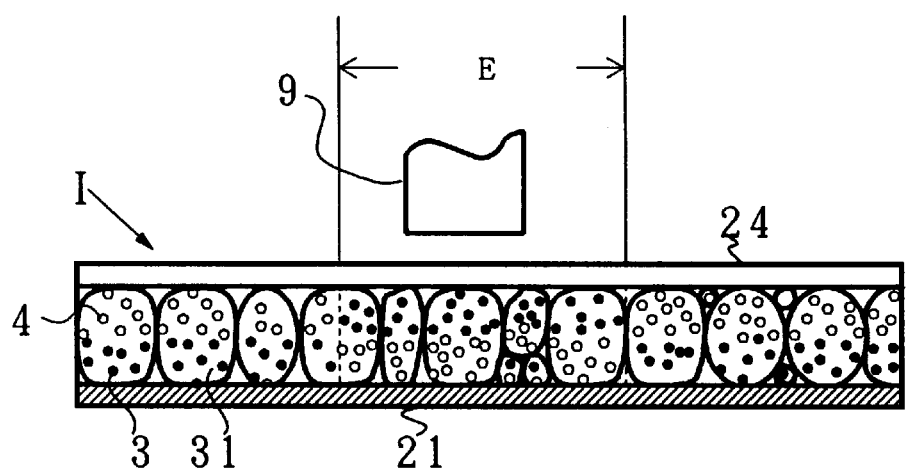

A method to display words on the magnetic display sheet II made of gelatinized microcapsules of the invention will be described in detail as follows. FIG. 5 is a cross-sectional view for describing the method on the magnetic display sheet II. FIG. 5A shows that a magnet is scanning on the backsurface of magnetic display sheet II and FIG. 5B shows that a magnetic pen is writing the capital E on the surface of the sheet. At first, a weak magnet sheet 8 (200 gauss) is used for scanning along the arrow on the pressure-proofing film 6 of the magnetic display sheet II as shown in FIG. 4 to move the magnetic powder 3 in the microcapsules I to the pressure-proofing film 6 (Erasing Operation). Because the magnetic powder 3 in the microcapsules exist only near to the pressure-proofing film 6 of the display sheet II and not in the record film 7 and only the nonmagnetic powder exists in it, the surface of the display sheet II is as white as the nonmagnetic powder be. Then, as shown in FIG. 5B, while writing words on the surface of the display sheet II with a magnet bar 9, a clear capital E appears.

Comparing the display plate II of the invention with a display sheet (sold on market) under the same conditions, while writing lines slowly on both, the lines on the sheet sold on market are not clear, but the lines on the invented sheet II are very clear. While writing lines fastly on both, the lines on the sheet sold on the market do not appear but the lines on the invented sheet II appear clearly. While erasing the words written on both, in the case of scanning slowly with a 200 gauss magnet sheet, in opposition to the display sheet sold on market in that the magnetic powder do not react to the magnet and the written words are not erased completely, the magnetic powder in the invented display sheet II react fastly to the magnet so the written words disappear completely and fastly.

Example 2

According to the example 1, microcapsules of about 400 μm has been prepared and microcapsules bigger than 400 μm have been removed out. Microcapsules about 500 μm and removing particles bigger than 500 μm, microcapsules about 700 μm and removing particles bigger than 700 μm, microcapsules about 800 μm and removing particles bigger than 800 μm, are respectively prepared, magnetic display sheet using them respectively are also produced and relations of scanning speed and erasing cleanness and writing speed and word clearness are investigated. All of the magnetic display sheets made of gelatinized microcapsules of the invention shows good effects. In opposition to the invention, magnetic display sheet made of microcapsules from that the particles bigger than average are not cut off shows unclearness of the written words.

Example 3

A magnetic display sheet made of microcapsules in 500 μm is prepared by the same method as example 1. While writing on the surface by a magnetic bar, clear words or pictures appear.

Example 4

A magnetic display sheet is prepared with the same method as the example 1 except dispersing the microcapsules prepared in example 1 in transparent binder of urethane resin and adding aqueous pigments (made in DAINISEI CHEMISTRY INDUSTRY INC.). The magnetic display sheet may be colored by adding pigment in it. Many kinds of color may be possible.

Example 5

Figure 6:
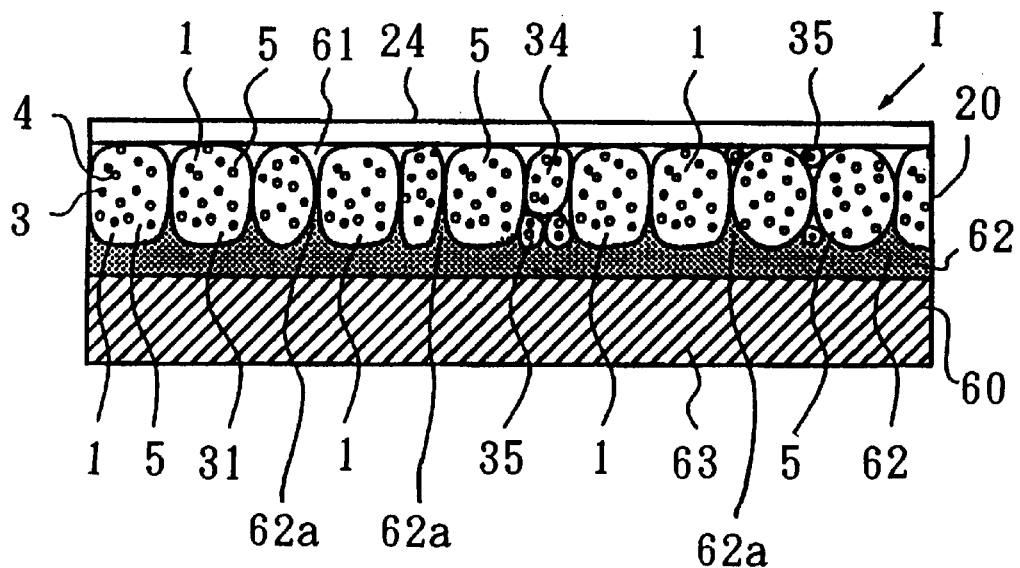
FIG. 6 or FIG. 9 is a cross-sectional view of a magnetic display sheet according to another embodiment of the invention.

The microcapsule magnetic display sheet I as shown in FIG. 6, a cross sectional view, is composed of pressure-proofing film 27, microcapsule dispersoid layer 20 thereon and then transparent film 21. The pressure-relieving film 27 and the transparent film 21 are adhered respectively by adhesives. The gelatinized microcapsules 1 used in the invention are prepared by traditional method. The microcapsules are composed of magnetic powder 3 of 2% in weight that are ferrite with diameter 0.3 μm in average and surface of them are treated by silicone oil (TAROKKUSU BL-220 in trade mark, made by CHITAN KOUGYOU INC.), nonmagnetic powder 4 of 11.6% in weight that are white titanium powders with diameter 0.3 μm in average and the surface of them are treated by silicone oil (KRONOS KR-330 made by CHITAN KOUGYOU INC.) and dispersion medium capsuled in the microcapsules. Particles in 400 μm to 600 μm are 85% in them.

The microcapsule magnetic display sheet I is made by the process of coating ink of microcapsule dispersoids on a transparent film 21 with thickness of 120 μm and made of polyethylene terephthalate, drying it to form microcapsule dispersoid layer 20 with a thickness of 600 μm and then adhering unwoven cloth 23 with a thickness of 500 μm as pressure-relieving element 27 on the surface of the dispersoid layer. Adhesives on the microcapsule dispersoids are not even, concave part 28 forms contact part of microcapsules themselves and adhesives 22 fill it in to stick them firmly. The microcapsule display sheet 1 made by the above-mentioned method has good flexibility. While writing words on surface of the magnetic display sheet I, not only the written words are clear, but also no destroyed microcapsules are discovered at repeated use.

Example 6

Figure 7:
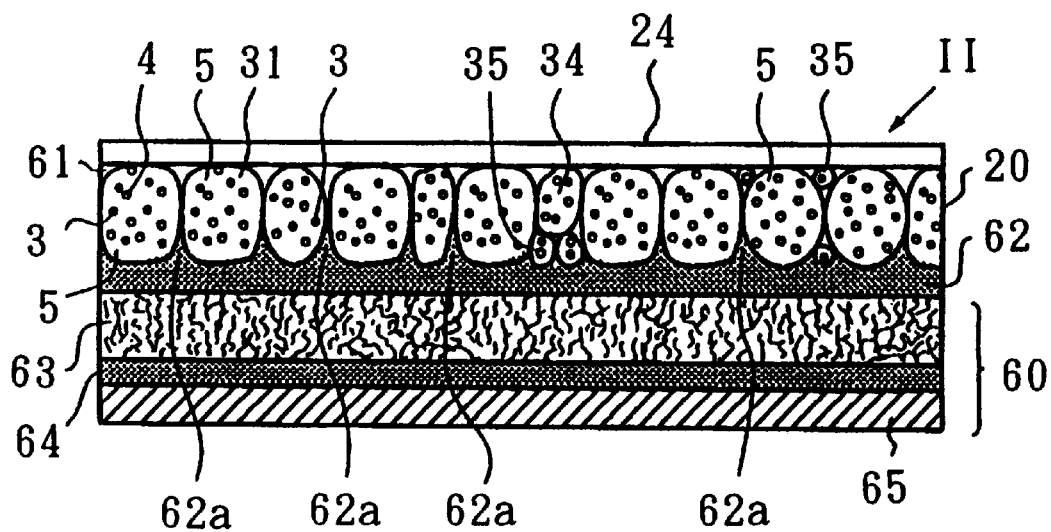
FIG. 7 is a cross-sectional view of one example of a pressure-proofing film of the magnetic display sheet.
Figure 8:
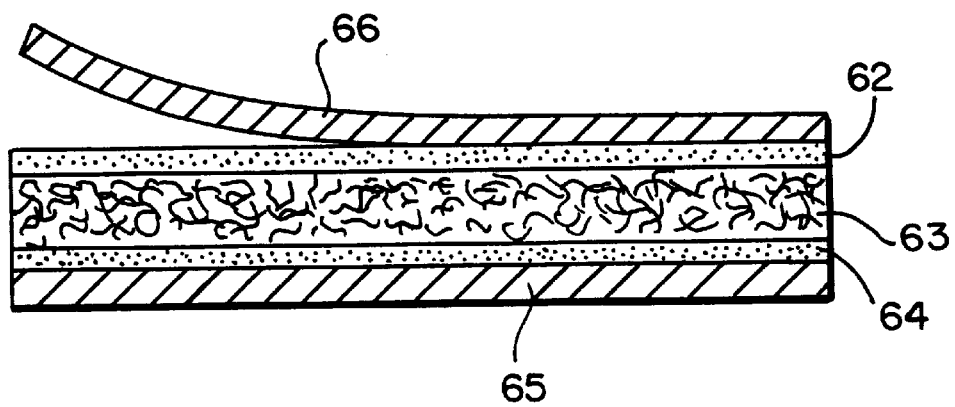
FIG. 8 is a cross-sectional view of another pressure-proofing film of the magnetic display sheet.

Microcapsule magnetic display sheet II shown in FIG. 7 is made as the same as example 1. Sheet II is made by the process of forming microcapsule dispersoid layer 20 with thickness of 600 μm and adhering unwoven cloth 23 (500 μm in thickness) as the pressure-relieving element 27 that has a lining 25 of polyethylene film with thickness of 100 μm. The surface of the microcapsule dispersoid layer 20 is uneven formed by the microcapsules. The pressure-relieving element 27 is shown in FIG. 8. FIG. 8 is a cross-sectional view of the pressure-relieving element. Synthetic film 25 of polyethylene on the back surface of unwoven cloth 23 of the pressure-relieving element 27 is adhered by adhesives 24.

Front surface of unwoven cloth 23 is covered by adhesives 22 and then a peelable film 26. While adhering the pressure-relieving element 27 to the uneven surface of the microcapsule dispersoid layer 20, peeling off the film 26. The sheet II obtained here has a good strength as the adhesives 22 fill the concave parts of the microcapsule dispersoid layer 20 and stick to it firmly without gap. While writing on the surface of the microcapsule display sheet obtained in the example 2 as the same as in example 1, it is clarified that the sheet has a good durability without destroyed particles and the lining 25 of polyethylene film has no influence on the erasing operation.

Example 7

Microcapsule magnetic display sheet is made by the same process as example 6 except adding aqueous colorant (NEW LACTISUM in trade mark, made by DAINISEI CHEMISTRY INC.) in aqueous adhesives 2 of the microcapsule dispersoid layer of the microcapsule display sheet II. By adding colorants in element, the sheet may be colored in many ways.

Example 8

Figure 9:
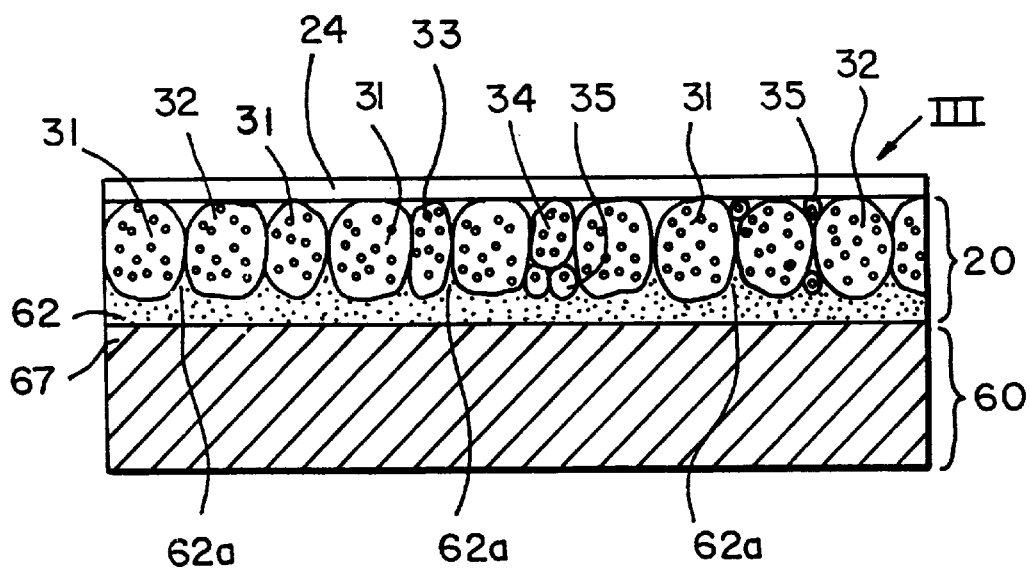

As shown in FIG. 9, instead of the pressure-relieving element 27 of the microcapsule display sheet I made in example 1, adhering polyethylene terephthalate 32 with thickness of 150 $\mu$m by acryl emulsion adhesives to form adhesive layer 31 and to produce the microcapsule display sheet III. While writing on the surface of the microcapsule display sheet III as the same as in example 1, it is clarified that the sheet has a good durability without destroyed particles and the lining 32 of polyethylene film makes no influence on erasing operation.

Example 9

Adding silica as filler in adhesives to form pressure-relieving element, then adhering the polyethylene terephthalate by adhesives to form adhesive layer to produce the microcapsule display sheet III as the same as in example 8. The thickness of the adhesive layer is about 50 $\mu$m. While writing on the surface of the microcapsule display sheet III as the same as in example 5, it is clarified that the sheet has a good durability without destroyed particles and the lining 32 of polyethylene film has no influence on the erasing operation.

Example 10

Microcapsule display sheet I is made by the same process as example 5 except the thickness of the transparent film being 50 $\mu$m, 80 $\mu$m, 100 $\mu$m, 180 $\mu$m. The microcapsule display sheet with 50 $\mu$m thickness of transparent film I is suitable to be connected to computer and that with 180 $\mu$m thickness of transparent film is desirable to be used for children at young age. The microcapsule display sheet II described in example 6 is also produced and the effects are the same.

Example 11

Microcapsule display sheet I is made by the same process as in example 5 except the thickness of the unwoven cloth being 50 $\mu$m, 120 $\mu$m, 150 $\mu$m, 180 $\mu$m, 200 $\mu$m, 250 $\mu$m, 300 $\mu$m, 340 $\mu$m, 420 $\mu$m respectively. The microcapsule display sheet with 50 $\mu$m thickness of the unwoven cloth is suitable to be connected to a computer and that with 400 $\mu$m thickness of the unwoven cloth is desirable to be used for children at a young age. The microcapsule display sheet II described in example 6 is also produced and the effects are the same.

Example 12

Microcapsule display sheet III is made by the same process as in example 8 except the thickness of the synthetic film being 50 $\mu$m, 80 $\mu$m, 100 $\mu$m, 125 $\mu$m, 180 $\mu$m, 200 $\mu$m respectively. The microcapsule display sheet with 50 $\mu$m thickness of the synthetic film is suitable to be connected to computer and that with 200 $\mu$m thickness of the synthetic film is desirable to be used for children at a young age.

Example 13

Microcapsule display sheet III is made by the same process as in example 8 except the thickness of the synthetic film being 150 $\mu$m and thickness of adhesive layer being 30 $\mu$m and 80 $\mu$m respectively. The microcapsule display sheet with 30 $\mu$m thickness of the adhesive layer is suitable to be connected to computer and that with 200 $\mu$m thickness of the unwoven cloth is desirable to be used for children at a young age.

What is claimed is:

1. A microcapsule magnetic display sheet sequentially provided thereon with a pressure-proofing film comprising a sheet vehicle which includes an adhesive layer having the thickness in a range of 30 $\mu$m to 130 $\mu$m; a microcapsule dispersoid layer comprising a microcapsule including, as a dispersion medium, a mixture of a low boiling point solvent and a high boiling point solvent having a boiling point higher than 175° C., magnetic powder and non-magnetic powder wherein said microcapsule has particles of a size of 400 $\mu$m±X$\mu$m to 800 $\mu$m±X$\mu$m, wherein X=10–20 and wherein particles having a particle diameter exceeding the upper limit are removed, and a transparent film.

2. A microcapsule magnetic display sheet according to claim 1, wherein said pressure-proofing film is made of unwoven cloth and synthetic film, said microcapsule dispersoid layer comprising a microcapsule including, as a dispersion medium, a low boiling point solvent lower than 145° C. or a mixture of a low boiling point and high-boiling point solvent having a boiling point higher than 175° C.

3. A microcapsule magnetic display sheet according to claim 2 wherein the thickness of the synthetic resin film is in a range of 50 $\mu$m to 200 $\mu$m.

4. A microcapsule magnetic display sheet according to claim 1, wherein the pressure-proofing film has a film layer on its surface.

5. A microcapsule magnetic display sheet according to claim 1, wherein the synthetic resin film is selected from the group consisting of polyethylene terephthalate film and polyethylene film.

6. A microcapsule magnetic display sheet according to claim 1, wherein a thickness of a synthetic resin film is in a range of 50 $\mu$m to 200 $\mu$m.

7. A microcapsule magnetic display according to claim 1, wherein said transparent film is selected from the group consisting of polyethylene film, chloroethylene film, polyester film and polycarbonate film.

8. A microcapsule magnetic display sheet according to claim 1 wherein the thickness of the transparent film is in a range of 50 $\mu$m to 180 $\mu$m.

9. A microcapsule magnetic display sheet according to claim 1 wherein the microcapsule dispersoid layer contains a binder and the binder is an aqueous transparent adhesive.

10. A microcapsule magnetic display sheet according to claim 1 wherein an aqueous colorant is contained in at least one of the dispersion medium in a microcapsule, a microcapsule membrane, a transparent layer, or transparent aqueous adhesives in the microcapsule dispersoids and pressure-proofing film.

11. A microcapsule magnetic display sheet according to claim 1 wherein the pressure proofing element is an unwoven cloth.

12. A microcapsule magnetic display sheet according to claim 11 wherein the thickness of the unwoven cloth is in a range of 250 $\mu$m to 500 $\mu$m.

\* \* \* \* \*